United States Patent [19]
Kroninger et al.

[11] Patent Number: 5,493,328
[45] Date of Patent: Feb. 20, 1996

[54] METHOD AND SYSTEM FOR ADDRESSING A HOME TERMINAL UNIT USING A FIBER-TO-THE-CURB SYSTEM

[75] Inventors: Robert S. Kroninger; Carlos G. Carvajal, both of Raleigh, N.C.

[73] Assignee: Alcatel Network Systems, Inc., Richardson, Tex.

[21] Appl. No.: 443,241

[22] Filed: May 17, 1995

Related U.S. Application Data

[63] Continuation of Ser. No. 45,816, Apr. 9, 1993, abandoned.

[51] Int. Cl.$^6$ ................................................. H04N 7/173
[52] U.S. Cl. .................................. 348/6; 348/1; 348/12; 455/3.1
[58] Field of Search .................................. 348/1, 2, 6, 7, 348/8, 12, 13; 358/84, 85, 86; 455/2, 3.1, 4.1, 4.2, 6.1, 5.1; 370/69.1, 73, 85.2, 85.3; 359/125; H04N 7/173, 7/16, 7/14, 7/22

[56] References Cited

U.S. PATENT DOCUMENTS

| | | | |
|---|---|---|---|
| 3,996,578 | 12/1976 | Takeuchi et al. | 340/416 |
| 4,343,042 | 8/1982 | Schrock et al. | 455/5 |

*Primary Examiner*—David E. Harvey
*Attorney, Agent, or Firm*—Baker & Botts

[57] ABSTRACT

A system for determining the physical location of a home terminal unit senses that a cable carries a communication signal from a home terminal unit to an optical network unit. The system includes the home terminal unit, the optical network unit, and a cable that connects the home terminal unit to the optical network unit. Additionally, energy detection circuitry associates with the cable to detect the presence of a communication signal on the cable and generates a detection signal in response to detecting the energy on the cable. Status circuitry for reading the detection signal connects with the energy detection circuitry and communicates the detection signal from the energy detection circuitry to the telecommunications network.

6 Claims, 3 Drawing Sheets

METHOD AND SYSTEM FOR ADDRESSING A HOME TERMINAL UNIT USING A FIBER-TO-THE-CURB SYSTEM

This application is a continuation of U.S. application Ser. No. 08/045,816 filed Apr. 9, 1993, by Robert S. Kroninger and Carlos G. Carvajal and entitled "Method and System for Addressing a Home Terminal Unit Using a Fiber-to-the-Curb System", now abandoned.

TECHNICAL FIELD OF THE INVENTION

The present invention is concerned generally with electronics and, more specifically, with electronic communications systems. Even more specifically, the invention is concerned with a method and system for determining not only the logical address from which a home terminal unit (HTU) or similar terminal communicates with a telecommunications network, but also the terminal's physical location.

BACKGROUND OF THE INVENTION

In the telecommunications industry, fiber-to-the-curb technology serves as the cornerstone for offering expanded and new information and entertainment capabilities to homes and businesses. Fiber-to-the curb technology is part of the continuing migration of optical fiber further and further into the communications loop that connects service providers and users. This technology brings with it capabilities and economies of scales that have not been possible before.

In a fiber-to-the-curb system, for signal communication and terminal control purposes, it is necessary to know the logical address of the Home Terminal Unit (HTU) that is communicating with a telecommunications network. This type of data is communicated in real time and is essentially independent of the HTU's physical location. In other words, as long as the network can identify the logical address of the HTU, there is no need to know from which home or business the HTU is communicating. For network service billing purposes, however, to know from which home the HTU is communicating is very important. While there are many protocols for addressing multiple terminals in a network, such as the HDLC and Ethernet protocols, no known protocol easily identifies the HTU's physical location. In fact, no reliable method or system exists that provides a method for determining the physical location of the terminal.

The state-of-the-art approach is to make handwritten or recorded reference lists of the location of the HTUs. The problems associated with cross-reference lists are human errors that often arise in manually recording information as well as the fact that such lists easily become outdated. Since a customer's bill is generated based on this information, however, it is important that it be accurate. Therefore, there is a need for a method for accurately determining the HTU's physical location as it communicates with the network is necessary.

An important consideration for any method or system that determines from which house the HTU communicates is to accommodate self-initialization. That is, such a method or system must make it so that a person does not need to tell the system in which house the HTU is located. Satisfying this need permits system changes to occur, such as moving an HTU from one house to another without losing track of the HTU's physical location. One way to meet this requirement might be to have a separate serial link from each optical network unit (ONU) of the fiber-to-the-curb system to each house that it serves. In this way, the ONU could easily identify the home from which it receives a communication signal. This method, unfortunately, has the drawback of adding circuitry to the ONU. The result is a more expensive more complex circuit. There is a need, therefore, for a method and system that fully avoids this complication.

It is an object of the present invention, therefore, to provide a method and system for determining the physical location of an HTU by determining that the coaxial cable that connects the HTU at the physical location to the network carries a communication signal.

It is also an object of the present invention to provide a method and system that identifies the physical location of an HTU by detecting that a coaxial cable between the HTU and associated ONU carries a carrier frequency signal. The method and system generate a detection signal in response to the carrier frequency signal to report the presence of the carrier frequency signal and communicates the detection signal to registering circuitry. Thus, by knowing the physical location to which the coaxial cable connects, it is possible to determine the physical location of the HTU that communicates the carrier frequency signal. The registering circuitry may then send a signal to the ONU for generating a telecommunications signal that includes the physical location of the HTU.

It is a further object of the present invention to provide a method and system that determines not only an HTU's logical address, but also the HTU's physical location each time the HTU communicates with the telecommunications network.

It is also an object of the present invention to provide a method and system that does not rely upon human intervention or record keeping to determine the physical location of the HTU from which the requests for communications services originate.

It is an object of the present invention to provide a system for determining the physical location of an HTU that is low in cost to manufacture and implement, easy to maintain, and highly reliable.

It is yet a further object of the present invention to provide a method and system for determining the physical location of an HTU that may accommodate growth of the number of HTUs at the same physical location without requiring changes to the existing circuitry.

BRIEF DESCRIPTION OF THE DRAWINGS

The objects and advantages of the present invention are apparent and best understood by reference to the following description of illustrative embodiments when read in conjunction with the accompanying drawings, wherein.

DETAILED DESCRIPTION OF THE INVENTION

In fiber-to-the-curb systems, branch single fibers connect from remote terminals to locations near or on a user's premises. An optical network unit (ONU) at the end of each fiber uses conventional metallic lines such as the coaxial cable for the last few feet to the home. It is possible, therefore, to connect customers without disturbing their existing on-premise wiring. This configuration permits maintaining the fiber's inherent advantages all the way from the central office from which the communication signals originate to the customer.

Each ONU provides up to 24 telephone or special service connections and eight video feeds. With this capacity, it is possible to give each of the eight homes two telephone lines and at least one video connection. Four separate video channels with four bi-directional controls on the video feed permit several people in each house to watch different programs. Fiber-to-the-curb technology, therefore, makes it possible to serve a variety of users, including, for example, a cluster of homes or a mixture of homes as small businesses from each ONU.

Each ONU includes a broadband interface unit (BIU) for communicating to the eight homes it may serve. The BIU communicates video control signals through either a switched video distribution (SVD) or a switched video distribution receiver (SVDR) that distributes the BIU's signals to the different coaxial cables connecting to the various HTUs and receives various signals from the HTUs. Each signal from an HTU carries with it a logical address that identifies the HTU as the source of the signal. The logical address, however, does not include any information relating to the HTU's actual physical location. Knowledge of the physical location, however, is necessary in order to properly determine the location for sending invoices and other billing information relating to the telecommunication services that the customer receives.

An important concept of the present invention, therefore, is the ability to determine not only the HTU's logical address, but also its physical location. The preferred embodiment of the present invention makes it possible to determine the physical location of the HTU and provides this information for billing purposes, for example, so that the location from which the HTU communicates receives the bill for the services that the network provides. There are other potential uses of the preferred embodiment, including the ability to determine that a home or business has independently added an HTU to its cable connection.

Figure 1:
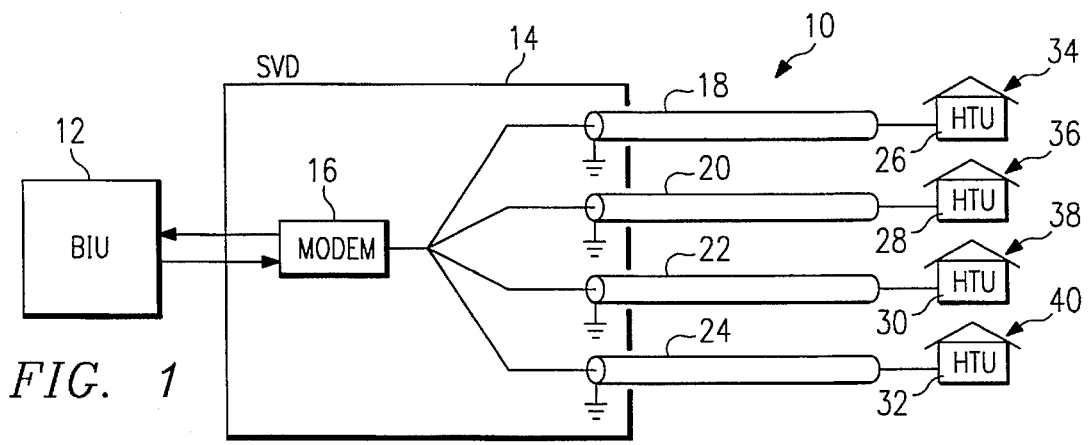
FIG. 1 shows a simplified block diagram of the environment of the present invention.

In FIG. 1, system 10 illustrates the environment of the preferred embodiment wherein BIU 12 communicates with SVD 14. SVD 14 includes modem 16 to which connect coaxial cables 18, 20, 22, and 24. Coaxial cables 18 through 24 connect to home terminals units 26, 28, 30, and 32 within home 34, 36, 38, and 40. In order to minimize circuitry on BIU 12, two serial ports communicate with up to four homes each. The BIU-to-HTU link is a point-to-multipoint link with one BIU 12 communicating with many HTUs. Since a single serial port can communicate with more than one HTU, the protocol that supports these logical addresses must differentiate among the different HTUs. However, only the HTUs are required to maintain the logical address data.

The method and system of the present invention for determining from which house the HTU communicates easily accommodate self-initialization. Therefore, a person does not need to tell the system in which house the HTU is located. This permits system reconfiguration such as moving an HTU from one house to another or adding an HTU to a home or business without the telecommunications service provider's knowledge. SVD 14 contains modem circuitry that converts the communication signals to and from BIU 12 into FSK signals. These FSK signals include a carrier frequency signal that a detection circuit may detect each time an HTU seeks to communicate with the ONU. An important point of departure for describing the preferred embodiment, then, is to note that instead of adding more serial links, it is possible to employ carrier frequency detection circuitry to detect signals on the coaxial cables that lead to modem 16 of SVD 14. In particular, coaxial lines 18, 20, 22 and 24 are separate coaxial cables between modem 16 and respective houses 34, 36, 38 and 40. The modem signals from the houses 34 through 40, are combined on SVD 14 before being decoded by modem receiver 16. The preferred embodiment of the present invention takes advantage of this fact.

Figure 2:
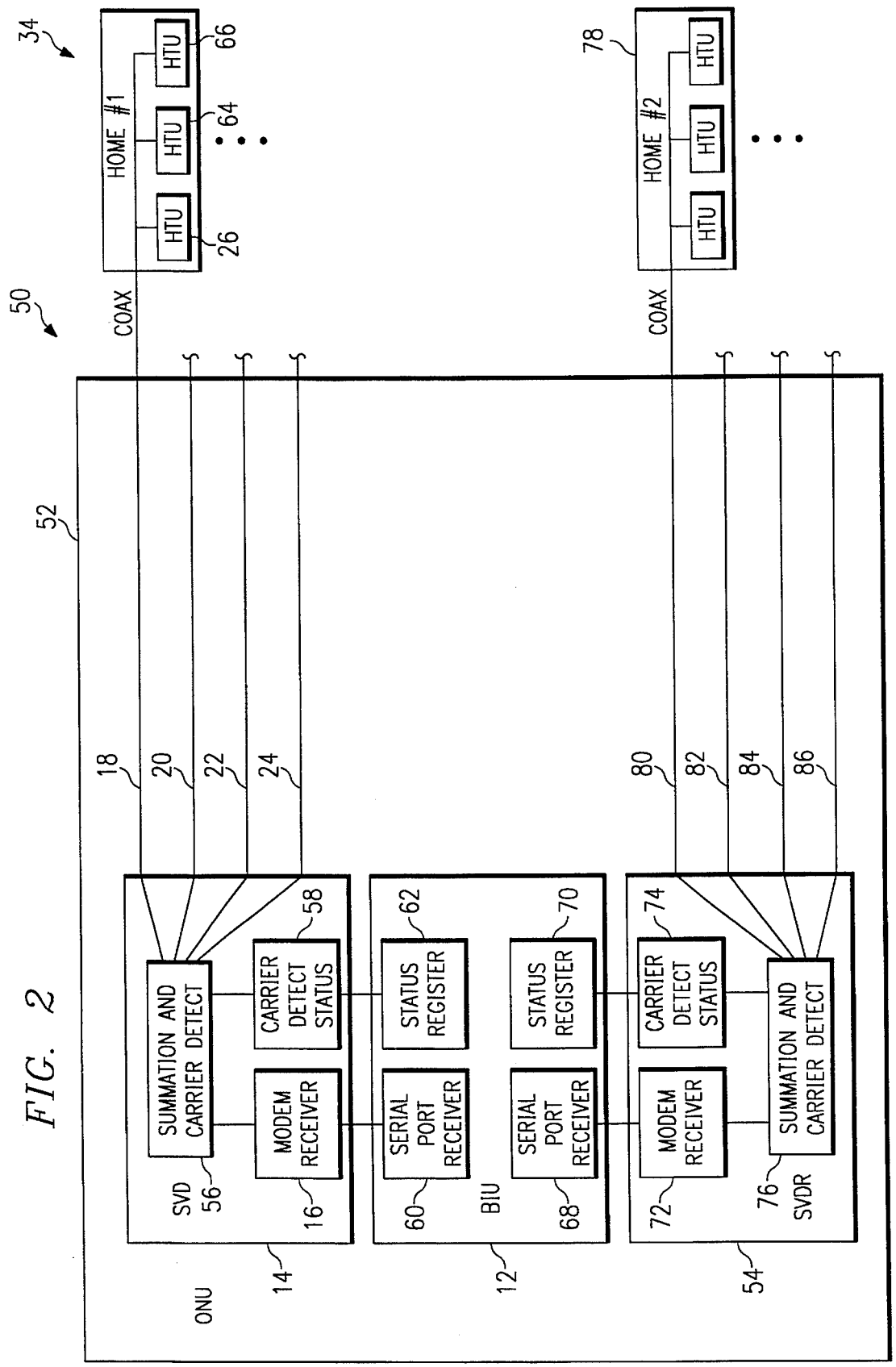
FIG. 2 illustrates a block diagram of the system of the preferred embodiment.

In FIG. 2, the preferred embodiment of the present invention appears. FIG. 2 shows system 50 of the preferred embodiment that includes ONU 52 on which is included BIU 12, SVD 14, and SVDR 54. Since BIU 12 includes two serial ports, SVDR 54 has a parallel configuration to that of SVD 14 for purposes of the present invention. Similar to that described in connection with FIG. 1, SVD 14 includes modem receiver 16 and connections to coaxial cables 18, 20, 22, and 24. In addition and of particular relevance for purposes of the present invention, SVD 14 further includes summation and carrier detect circuit 56 and carrier detect status circuitry 58.

Modem receiver 16 connects to BIU 12 at serial port receiver 60. Carrier detect status circuitry 58 connects with BIU 12 at status register 62. Note that from SVD 14 to home 34 the coaxial cable connections are essentially the same as that described in connection with FIG. 1. FIG. 2 also points out that each coaxial cable, such as coaxial cable 18 may connect to multiple HTUs in a single home. This is shown by home 34 including not only HTU 26, but also HTU 64 and 66, for example.

Because BIU 12 includes a second serial port receiver 68 and may also include a second status register 70, connections to SVDR 54 may be similar to the connections of SVD 14. Therefore, SVDR 54 includes modem receiver 72 and carrier detect status circuitry 74, that communicate with summation and carrier detect circuitry 76 for summing the signals and communicating to another set of four homes, such as home 78, through coaxial cables 80, 82, 84, and 86.

The preferred embodiment of the present invention encompasses SVD 14 and SVDR 54 each having a summation and carrier detect circuit such as the circuits 56 and 76, respectively, for determining the presence of a carrier frequency to each home. BIU 12 uses status registers 62 and 70 to read the carrier detect outputs from carrier detect status circuits 58 and 74, respectively. The carrier frequency on each of the coaxial cables has a unique association with the physical location of the HTUs in each of the respective homes. Thus, with little additional circuitry and using established techniques, it is possible to determine the location to which a carrier frequency signal is being sent from ONU 52 to any one of the homes that the communication system services.

It is important to note that the added circuitry to perform the carrier detection is minimal compared to adding four separate modems as would be the case in a point-to-point system. Additionally, BIU 12 does not need any additional serial ports according to the preferred embodiment.

Figure 3:
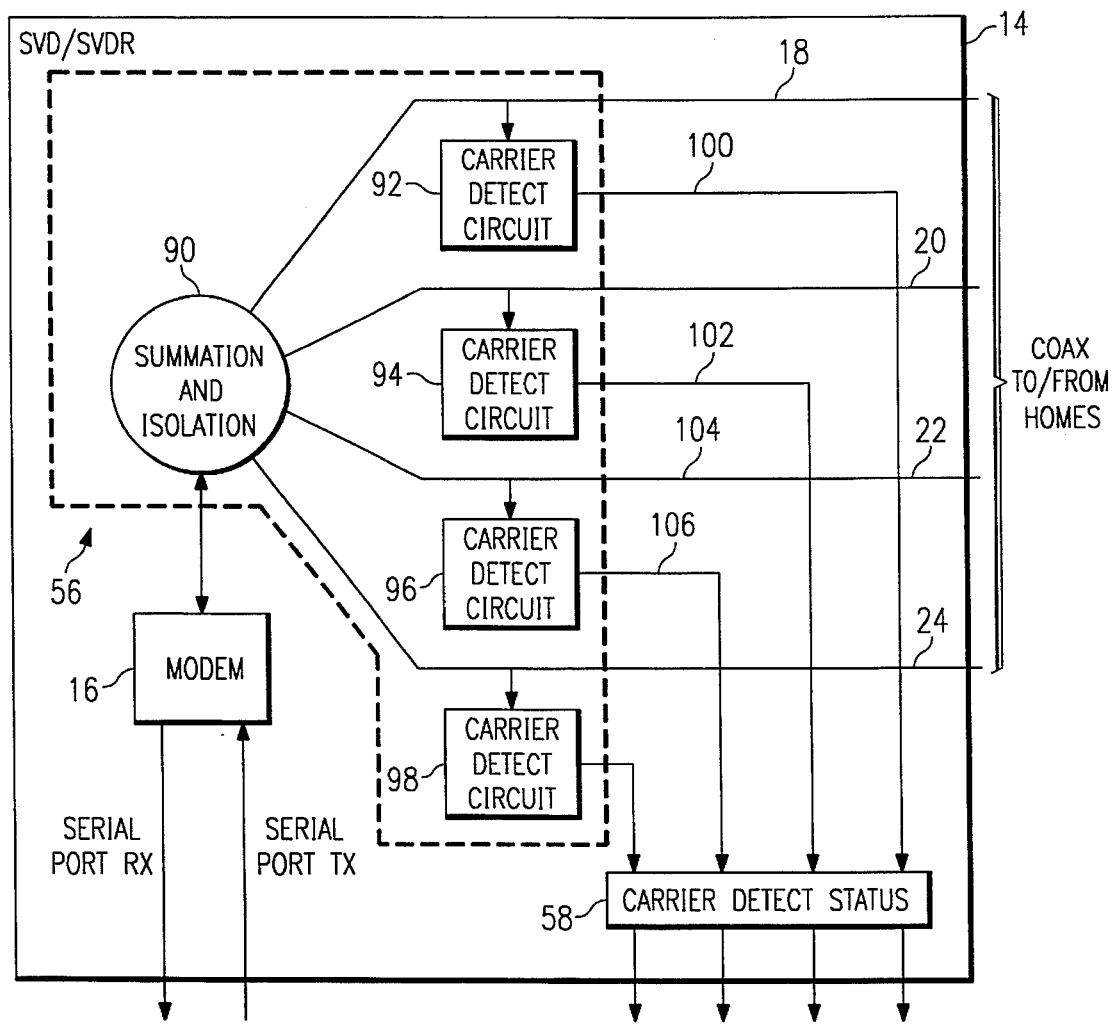
FIG. 3 illustrates a more detailed block diagram of certain aspects of the system described in connection with FIG. 2.

In FIG. 3, an even more detailed block diagram appears for determining the existence of a carrier frequency from BIU 12 to the physical location of an HTU. FIG. 3 shows SVD 14 (or similarly, for purposes of the present invention, SDVR 54) for implementing the concepts of the present invention. In particular, SVD 14 includes modem 16 that communicates with BIU 12 and summation carrier detect circuit 56 (as illustrated by the dash line). Summation and carrier detect circuit 56 may be thought of as including summation circuit 90 that sums the signals from coaxial cables 18, 20, 22 and 24. Also, summation and carrier detect circuit 56 includes carrier detect circuits 92, 94, 96, and 98 for determining a carrier frequency on coaxial cables 18, 20, 22, and 24, respectively. The output of carrier detect circuits 92 through 98 passes through lines 100, 102, 104, and 106, respectively, to carrier detect status circuitry 58. Carrier detect status circuitry 58 provides a detect status signal back to status register 62 of BIU 12.

Modem 16 within SVD 14 uses frequency modulation for communication. This makes isolation of the energy associated with the signal relatively simple to achieve. Isolation makes it possible to determine the exact coaxial cable from which the signal is communicating and to know what cable is sending data to which home terminal unit. Since there is a separate coaxial cable to each home, there is a one-to-one correspondence between the carrier detect circuits and the coaxial cables. Carrier detect circuits 92 through 98 each can identify whenever there is a change in the data flow on coaxial cables 18 through 24, respectively. Thus, for example, when a user initiates a channel change, a carrier frequency appears on the coaxial cable, for which the associated carrier detect circuit detects the presence of the energy from the signal and transmits that detection to carrier detect status circuitry 58.

An important aspect of the present invention is that it permits detecting carrier frequency signals from BIU 12 to multiple HTUs at a single physical location. Because the signal for which the carrier frequency appears has a short duration, it is possible to employ a IEEE protocol standard 802.3, entitled Carrier Sense Multiple Access with Collision Detection (CSMACD) to avoid collision of signals passing through a common bus. A network that employs the IEEE 802.3 standard accommodates many devices connected together through a common bus. The bus may be used to communicate between different devices, where each device has equal access to the bus for transmitting information to another device. In the IEEE 802.3 standard protocol, before sending any information, a device must first "listen" to the bus to ensure that there is no traffic presently on the bus. As soon as the bus is clear, the device can begin transmitting its information. Even though each device listens to the bus before transmitting its information, there is a window in which two (or more) devices could find the bus clear and both begin transmitting at the same time. If during the transmission of its data, a device notices that another device has begun transmitting at the same time (i.e., a collision is detected), the device must stop transmitting its data. The device waits a random amount of time before retrying to transmit over the bus. The random delay assures that if two devices collide on the bus, they will not attempt to retry transmitting on the bus at the same time. To support this aspect of the preferred embodiment, therefore, the IEEE 802.3 CSMACD standard is incorporated herein by reference in its entirety.

The method and system of the preferred embodiment provide a low cost solution to the problem of identifying the HTU's physical location. One reason this is so is that only the existing serial port receivers on BIU 12 are necessary to talk to and identify the physical location of HTU's in as many as eight homes. The single serial link also makes the present invention attractive because only a small number of additional parts are necessary to perform the combined functions of carrier detect circuits 92 through 98, carrier detect status circuitry 58, and status register 62 in SVD 14 and BIU 12, and the correspondingly similar components in SVDR 54. Also, for the slight amount of additional time necessary to make the carrier detect determination and to report that detection to the status register, a significant improvement in the network to account for and record customer use results.

OPERATION

Figure 4:
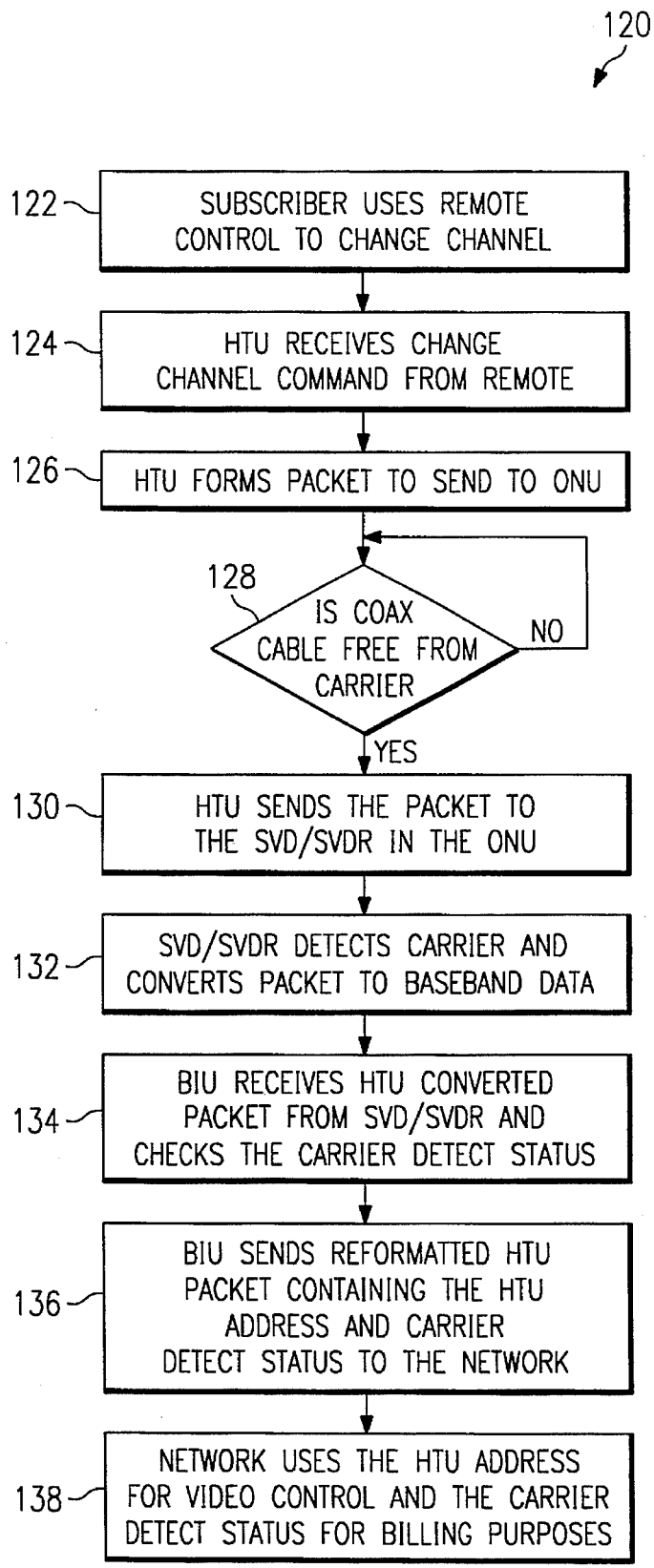
FIG. 4 illustrates a flowchart of the steps for implementing the preferred embodiment of the present invention.

Having explained generally the structure and function of the preferred embodiment, the illustrative example of FIG. 4 shows how the preferred embodiment provides detection and identification of carrier frequency signals between an ONU and HTU to determine the HTU's physical location. Therefore, referring to FIG. 4, flow chart 120 begins at block 122 at which point a user operates, for example, a remote control to change the channel that he is receiving through his HTU. Thus, in the same way a user may communicate with a television set or a VCR, the user communicates with the HTU directly to issue a command, such as to change the television channel. In response to user action, the HTU receives the change channel instruction at block 124 from the remote control. In response to the command, the HTU will form a packet to send to ONU 52, as indicated in block 126.

With the packet formed and ready to send to ONU 52, the HTU may employ the CSMACD IEEE 802.3 standard protocol to determine if the coaxial cable is free from a carrier signal. Query 128 represents this step. Thus, if the coaxial cable is not free from a carrier signal, this step will be repeated until the coaxial cable is free from a carrier signal. At which point, the process goes to block 130 where the HTU sends a packet to SVD 14 (or SVDR 54) in ONU 52. Although this discussion relates to operations at SVD 14 and associated circuitry, operation of SVDR 54 occurs in a very similar manner. SVD 14 then detects the carrier frequency signal and converts the packet to baseband data as indicated by block 132.

Block 134 represents the fact that BIU 12 receives the HTU-converted package from SVD 12 and checks the carrier detect status using status register 62. That is, the carrier detect status circuit 58 of SVD 14 communicates directly to status register 62 without passing through modem receiver 16 of SVD 14. The carrier detect status check is, therefore, a separate step from that of receiving communication data in serial port receiver 60 of BIU 12. Therefore, there are two separate steps in the receipt of the packet in BIU 12. The first step being that of receiving the packet at the serial port receiver 60. The second step is checking the carrier detect status from the coaxial cables.

In block 136 appears the step of BIU 12 sending a reformatted HTU packet containing the HTU address and carrier detect status to the communications network. The BIU, therefore, reformats the packet, because it has to add the fact that ONU 52 itself has the physical address or location of the HTU. Thus, BIU 12 sends both the packet of information and the physical location of the HTU from which the packet originated to ONU 52. ONU 52 may then transmit this data to the telecommunications network to permit both providing the required video to the HTU as well as automatically generating billing data pertaining to the services provided. Finally, block 138 represents the steps of the network using the HTU address for video control and the carrier detect status for billing purposes.

An important technical advantage of the preferred embodiment is that each time an HTU communicates with the telecommunications network the network can determine the HTU's physical location. That is, the preferred embodiment makes it possible to identify the home from which an HTU is communicating. System 50 of FIG. 2, for example, does not rely on human intervention or record keeping to determine which house to bill for requested services. Additionally, because only one serial link is required for multiple homes, the system of the preferred embodiment is low in cost, requires fewer parts, and has higher reliability than a point-to-point communication system. Furthermore, the system of the preferred embodiment accommodates system growth as more HTUs are added to the telecommunications network.

Another technical advantage of the present invention is that it provides a non-intrusive way of determining the presence of the carrier signal. Thus, by simply sensing the existence of a carrier signal on the associated coaxial cable, no detrimental affects occur to the packet of information as it travels from HTU to the network. By simply pulling off the carrier frequency signal that is present on coaxial cables 18 through 24 using carrier detect circuitry 92 through 98, for example, the preferred embodiment provides a simple, non-intrusive, reliable way of determining the physical location of an HTU as it communicates with the network.

In summary, there is provided a method and system for determining the physical location of an HTU by detecting the presence of a carrier frequency on a cable that connects between an ONU and the HTU. In the method and system, carrier frequency detection circuitry associated with the ONU detects the presence of a carrier frequency signal on the cable and generates a detection signal in response to detecting the carrier frequency signal. Recording circuitry within the ONU records the detection signal and detection signal communicating circuitry communicates the detection signal from the carrier frequency detector circuitry to the recording circuitry to record the presence of a carrier frequency signal on the cable. By identifying the source of the carrier frequency signal, it is possible to determine the HTU's physical location.

As a result of the above, although the invention has been described with reference to the above embodiment, its description is not meant to be construed in a limiting sense. Various modifications of the disclosed embodiment, as well as alternative embodiments of the invention will become apparent to persons skilled in the art upon reference to the above description. It is, therefore, contemplated that the appended claims will cover such modifications that fall within the true scope of the invention.

What is claimed is:

1. A system for determining the physical location of a home terminal unit that communicates with a telecommunications network, the system comprising:

a home terminal unit for receiving and transmitting communication signals;

a telecommunications network comprising network communications circuitry for communicating the communications signals to and from said home terminal unit;

a cable for connecting said home terminal unit to said network communications circuitry;

energy detection circuitry coupled to said cable for detecting energy associated with the transmission of the communication signals on said cable between said home terminal unit and said network communications circuitry and for generating a detection signal responsive to detecting communication signals on said cable;

status circuitry for reading the detection signal;

detection signal communication circuitry for communicating the detection signal from said energy detection circuitry to said status circuitry as corresponding to the physical location of said home terminal unit; and interface circuitry for receiving the detection signal and the communication signals for determining the physical location of said home terminal unit that communicates with said telecommunications network.

2. A method for determining the physical location of a home terminal unit that communicates with telecommunications network, the method comprising the steps of:

connecting a home terminal unit to the telecommunications network with a cable coupled to network communications circuitry in the telecommunications network;

communicating communication signals between the home terminal unit and the network communications circuitry on the cable;

detecting the energy associated with the transmission of the communication signals on the cable and generating a detection signal responsive to detecting the energy on the cable;

reading the detection signal as uniquely identifying the physical location of the home terminal unit; and receiving the detection signal and the communication signals for determining the physical location of said home terminal unit that communicates with said telecommunications network.

3. A system for determining the physical location of each of a plurality of home terminal units that communicates with a telecommunications network, the system comprising:

a plurality of home terminal units each located at a different physical location, each home terminal unit operable to receive and transmit communication signals;

a telecommunications network comprising network communications circuitry for communicating the communication signals to and from each of said plurality of home terminal units;

a plurality of cables each for connecting one of said plurality of home terminal units to said network communications circuitry;

a plurality of energy detection circuits each associated with one of said cables for detecting energy associated with the transmission of communication signals on its associated cable and for generating a detection signal responsive to detecting the energy on its associated cable;

status circuitry coupled to each of said energy detection circuits for reading the detection signals from said plurality of energy detection circuits;

detection signal communication circuitry coupled to each of said energy detection circuits for communicating the detection signals from each of said energy detection circuits to said status circuitry as corresponding to the physical location of each of said home terminal units; and interface circuitry for receiving the detection signal and the communication signals for determining the physical location of said home terminal unit that communicates with said telecommunications network.

4. A method for determining the physical location of each of a plurality of home terminal units that communicate with a telecommunications network, the method comprising the steps of:

connecting a plurality of home terminal units each located at a different physical location to the telecommunications network with a plurality of cables coupled to network communications circuitry in the telecommunications network, each of said cables being uniquely associated with one of said different physical locations;

communicating communication signals between the home terminal units and the network communications circuitry on the plurality of cables;

detecting the energy associated with the transmission of the communication signals between at least one home terminal unit and the network communications circuitry on at least one of said cables using a plurality of energy detection circuits each uniquely associated with one of the cables and generating a detection signal responsive to detecting the energy on the one cable;

reading the detection signal as uniquely identifying the physical location of the one home terminal unit; and receiving the detection signal and the communication signals for determining the physical location of said home terminal unit that communicates with said telecommunications network.

5. The system of claim 3 wherein each home terminal unit transmits the communication signals at substantially the same frequency.

6. The method of claim 4 wherein said communications step further comprises communicating the communication signals on the plurality of cables at substantially the same frequency.

* * * * *